Figure 1:
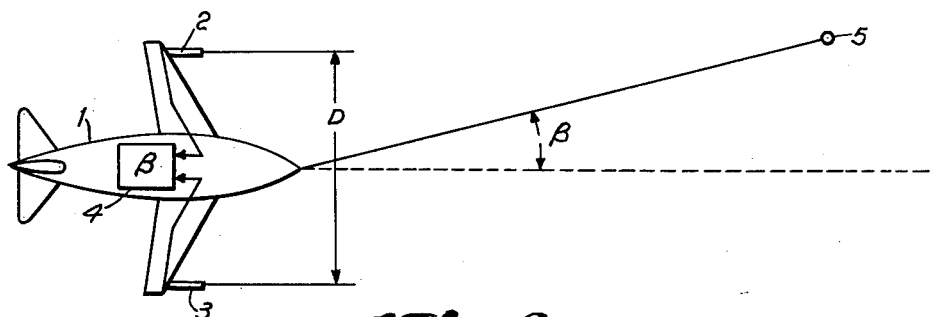

Aug. 15, 1961  W. H. HEISER  2,996,711
DIRECTION FINDING SYSTEM
Filed Nov. 7, 1958

Inventor
WILLAM H. HEISER
By Robert T Dunn
Agent

United States Patent Office 2,996,711
Patented Aug. 15, 1961

2,996,711
DIRECTION FINDING SYSTEM
William H. Heiser, Ramsey, N.J., assignor to International Telephone and Telegraph Corporation, Nutley, N.J., a corporation of Maryland
Filed Nov. 7, 1958, Ser. No. 772,483
14 Claims. (Cl. 343—105)

This invention relates in general to direction finders and interferometric guidance systems and more particularly to a system suitable for guiding a craft and providing an indication of direction from the craft to a radiating source without ambiguity.

In the past, direction finder and interferometric guidance systems have been employed for determining the direction of a radiating source from spaced receiving antennas. The principle involved is well known and involves comparing the phase of received signals detected by said receiving antennas to yield a phase difference signal $\theta$, then computing the directional angle, $\beta$, from the antennas to the source as a function of $\theta$, the distance between the antennas D, and the wavelength $\lambda$ of the radiation from the source. Many of these prior systems employ phase comparing means suitable only for measuring phase differences of less than 90°. Such phase comparing means become quite inaccurate when the phase difference approaches 90° and are not capable of resolving ambiguities when the phase difference is greater than 90°. Consequently, these prior systems are not capable of measuring $\beta$ angles for which sin $\beta$ is greater than $\lambda/4D$ and this severely limits the utility of such systems.

It is an object of this invention to provide an improved interferometric guidance system whereby the bearing from a craft to a radiating source may be accurately determined without ambiguity over a wide range of bearings.

It is another object to provide a system whereby the direction towards a source of frequency modulated radiation may be accurately determined over a wide range of bearings.

It is another object to provide improved direction finding means for determining the direction from a group of two or more antennas to a source radiating a frequency modulated signal.

It is a feature of this invention to employ at least two spaced receiving antennas to detect frequency modulated signals from a source of radiation and obtain the phase difference between the signals detected at each of the antennas, noting the number of a cycles of change in the phase difference which occur when the source radiates over a given range of frequency, said number being indicative of the relative bearing from the antennas to the source.

It is another feature of this invention to count the nulls and the peaks in said phase difference signal as the source radiates over said given range of frequency and to employ said count to indicate the bearing from said antennas to said source.

It is another feature to employ gating means for gating the count of nulls and peaks in accordance with the output from the local oscillator of the receiver responsive to the frequency modulated signals detected by said antennas, said local oscillator being controlled by an automatic frequency control.

Figure 2:
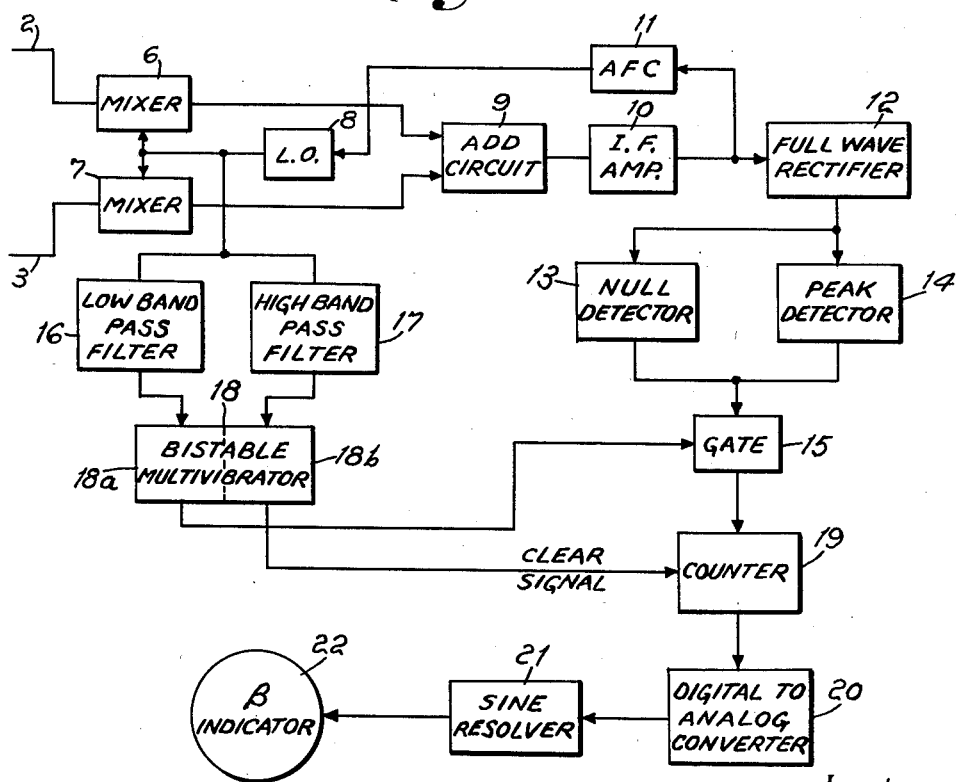

Other and further features and objects of this invention will become more apparent from the following specific description taken in conjunction with the drawings in which:

FIG. 1 depicts a craft having spaced antennas at its wing tips for detecting radiation from a source at a bearing angle $\beta$ from the craft; and FIG. 2 is a block diagram of the system in the craft for computing the bearing from the craft to the radiating source.

Turning first to FIG. 1, there is shown an aircraft 1 having spaced antennas 2 and 3 at its wing tips with transmission lines from these antennas to bearing angle computing means 4, located in the body of the craft. The spacing between antennas 2 and 3 is denoted by the distance D and the relative bearing from the craft towards frequency modulated radiating source 5 is denoted by the angle $\beta$.

In general, the system described in this invention operates as follows. The phase difference between the signals from source 5 detected by antennas 2 and 3 will vary directly with the sin $\beta$ and the frequency of the source. Consequently, if $\beta$ is fixed and the source frequency varied a known amount, then the number of degrees change in the phase difference between the signals detected by antennas 3 and 4 will be indicative of $\beta$. As the frequency of source 5 varies a known amount the number of cycles of change in the phase difference between signals detected by spaced antennas 3 and 4 is counted. This count is indicative of sin $\beta$.

For example, assume that source 5 is radiating at a frequency of $f_0$, having a wavelength $\lambda_0$, then the phase difference between signals received at antennas 2 and 3 will be denoted as $\theta_0$ and the relationship between $\theta_0$, the angle $\beta$ and $f_0$ or $\lambda_0$ is as follows:

(1) $$\theta_0 = \frac{2\pi D \sin \beta}{\lambda_0} = 2\pi D \sin \beta \cdot \frac{f_0}{C}$$

where C is the speed of light

When the frequency of the signal radiated from source 5 shifts by an amount $\Delta f$ so that the frequency radiated is $f_0 + \Delta f$, then the phase difference between the signals detected at antennas 2 and 3, denoted $\theta_{\Delta f}$ is represented as follows:

(2) $$\theta_{\Delta f} = 2\pi D \sin \beta \cdot \frac{(f_0 + \Delta f)}{C}$$

Consequently, when the frequency of the signal radiated from source 5 is shifted monotonically from $f_0$ to $f_0 + \Delta f$, the phase difference between the signals detected at antennas 2 and 3 will be shifted by an amount equivalent to $\theta_0 - \theta_{\Delta f}$ which can be represented as follows:

(3) $$\theta_0 - \theta_{\Delta f} = \frac{2\pi D \sin \beta}{C} \cdot \Delta f$$

The number of nulls or complete cycles change in phase difference which occur as the phase difference goes from $\theta_0$ to $\theta_{\Delta f}$ is representative of $(\theta_0 - \theta_{\Delta f})/2\pi$. Consequently, if the number of nulls or complete cycles is denoted as N, then N may be represented as follows:

(4) $$N = D \sin \beta \frac{\Delta f}{C}$$

Thus, if $\Delta f$ is fixed by, for example, preset low and high pass filters in the receiving equipment associated with the antennas, then the number of peaks and nulls which occur as the source frequency goes from $f_0$ to $(f_0 + \Delta f)$ is directly proportional to sin $\beta$. It can be seen from Equation 4 above that N is a function of $\beta$ if $\Delta f$ is fixed. Consequently, by counting the number of nulls or complete cycles as the source 5 radiates over the frequency range $\Delta f$, to obtain the number N, an indication of the angle $\beta$ can be obtained.

Turing next to FIG. 2 there is shown a block diagram of the computing means 4 in craft which comprises mixers 6 and 7 coupled to antennas 2 and 3, respectively, and serving to mix the signals from their respective antennas with the signals from local oscillator 8 whose output is also coupled to each of the mixers. Since the antennas feeding the mixers are both responsive to the same source and a single local oscillator feeds both the mixers, the outputs from the mixers are at the same frequency but differ in phase from each other by an amount proportional to the phase difference between the signals detected by antennas 2 and 3. The outputs from mixers 6 and 7 are fed to add circuit 9 which may be, for example, a summing amplifier or any other means for adding two signals of the same frequency. Since the output from mixers 6 and 7 are signals of the same amplitude and frequency, the magnitude of the output from add circuit 9 will be indicative of the phase difference between the signals fed to each of the mixers and the frequency of the output will be the same as the outputs from mixers 6 and 7, herein referred to as IF. The output from add circuit 9 is fed to IF amplifier 10 and the output from amplifier 10 is fed via AFC circuit 11 to the input control of local oscillator 8. Thus, through the action of AFC circuit 11 the outputs from mixers 6 and 7 are maintained at IF frequency even though the frequency of the signal from source 5 is varied.

As the phase difference between the signals from mixers 6 and 7 varies through a complete cycle, the output from add circuit 9 will be modulated over a complete cycle of modulation. In other words, the modulation envelope of the IF output from add circuit 9 will represent the phase difference between the signals from the mixers. Consequently, a count of the number of nulls or peaks in this envelope which occur as the frequency of the signal from source 5 changes from $f_0$ to $(f_0 + \Delta f)$ will yield the number N which is indicative of $\sin \beta$ as shown by Equation 4. In order to obtain the modulation envelope, the output from amplifier 10 is rectified by full wave rectifier 12, yielding the modulation envelope which is applied to null detector 13 and peak detector 14, which detect the nulls and peaks, respectively, in the modulation envelope signal from IF amplifier 10. These nulls and peaks, represented as pulses in the outputs of circuits 13 and 14, are fed to coincidence gate 15. Meanwhile, the output from local oscillator 8 is applied, via a pair of very narrow band filters, low pass filter 16 and high pass filter 17, to different stages of double input bistable multivibrator 18. It is to be noted that the AFC circuit will cause the output frequency of local oscillator 8 to vary in the same sense and by the same amount as the radiated signal frequency, thereby maintaining the IF output frequency constant. The difference in frequency between the narrow band signal passed by low pass filter 16 and the narrow band signal passed by high pass filter 17 is a predetermined frequency range having a predetermined relationship to the frequency range $f_0$ to $(f_0 + \Delta f)$ over which radiation source 5 radiates. The output of stage 18a of multivibrator 18, which is triggered by the output of filter 16 is applied to coincidence gate 15, thus when triggered, stage 18a applies a signal to gate 15 allowing the null and peak pulses from detectors 13 and 14 to pass through gate 15 to pulse counter 19. Pulse counter 19 thus serves to count the nulls and peaks in the modulation envelope of the signal from IF amplifier 10 which occur following the detection of a given frequency signal $f_0$ by the antennas 2 and 3 as established by low pass filter 16. Stage 18b of multivibrator 18 is triggered by the signal from high pass filter 17 and when triggered, stage 18a serves to clear counter 19.

In operation, counter 19 counts all nulls and peaks in the IF signal which occur as the frequency of the signal from source 5 sweeps through a frequency range measured by filters 16 and 17. In terms of Equations 1 through 4 low and high pass filters 16 and 17 are tuned to pass very narrow bands of frequencies each centered at a different frequency. The center frequencies of these bands differ by the amount $\Delta f$.

Other methods could be employed for controlling gate 15 and clearing counter 19 so that cycles of phase difference are counted only as the frequency of source 5 sweeps through the range $\Delta f$. For example, the signal level output from AFC circuit 11 is indicative of the frequency from source 5 and could be employed to trigger circuits for controlling gate 15 and counter 19.

The output of counter 19, which is indicative of $\sin \beta$, is fed via digital-to-analog converter 20 to sin resolver 21 and the output of resolver 21 is applied to an indicator 22 for indicating the angle $\beta$.

Obviously, the output from resolver 21 may be applied to a guidance system on board craft 1 for guiding the craft towards radiating source 5 or for guiding the craft to fly any desired bearing relative to source 5.

In summation, my invention operates as follows: signals radiated from a radiating source are received at two spaced antennas. The received signals are additively combined in order to produce a signal having a peak amplitude determined by the phase difference between the received signals. The radiated signal frequency is varied monotonically over a frequency range including two predetermined frequencies, in order to produce a variation in the phase difference between the received signals indicative of the directional angle which characterizes the bearing of the line joining the antennas relative to the direction of the radiating source. It has been shown that this bearing angle is determined by the total variation in the phase difference between the received signals as a result of a variation of the transmitted frequency over a predetermined frequency range. Thus, the signals resulting from the additive combination of the received signals will undergo peak amplitude variations in accordance with the variations in the phase difference between the received signals. As the phase difference between the received signals varies through a complete cycle, the peak amplitude of the sum signal will undergo a complete cycle of variation. The total number of peaks and nulls in each such cycle provides a measure of the total phase difference variation, and thus an indication of bearing angle.

Since the radiated signal will vary over a fairly wide frequency range, it is desirable to additively combine the received signals at a single frequency in order to avoid complications due to bandwidth limitations. Accordingly, the received signals are first heterodyned to a fixed intermediate frequency by means of mixers having a common local oscillator input. In order to maintain the mixer outputs at the intermediate frequency, while the radiated signal is varying in frequency, an AFC circuit is utilized to cause the local oscillator to follow the frequency variations of the radiated signal. As a result, the local oscillator varies over a frequency range corresponding to the range of variation of the received signals. Furthermore, the local oscillator variation includes two predetermined frequencies corresponding to the two predetermined frequencies associated with the radiated signal. Accordingly, the predetermined frequencies associated with the local oscillator are used to determine the limits of the predetermined frequency range over which the total variation in phase difference is measured. This is accomplished by providing a fixed low band pass filter and a fixed high band pass filter which respond respectively to the lower and higher of the predetermined frequencies associated with the local oscillator. The outputs of these filters are used to condition a bistable multivibrator into its opposite stable states. In one of these states, the multivibrator provides an output signal which opens a gate permitting signals to pass through the gate, and in the opposite stable condition the multivibrator closes the gate.

The mixer outputs are intermediate frequency (IF) signals which undergo that same relative phase variations as the corresponding received signals. These IF signals are amplified and detected, and nulls and peaks in the detected signals are further detected by null and peak detectors, respectively, which provide output pulses in coincidence therewith. These output pulses are applied to the above mentioned gate, and pass through the gate when the multivibrator is properly conditioned. As previously indicated, the multivibrator will be in the proper condition only during the interval in which the local oscillator frequency varies between the associated predetermined frequencies in monotonically increasing fashion. The output of the gate is applied to a counter which accumulates a total count equal to the total number of pulses passing through the gate during each monotonically increasing variation of the radiated frequency over the predetermined range. Thus, the counter contents, after the gate is closed, represent the total variation in phase difference, and this quantity is converted to an analog indication of direction utilizing the known relationsship between the total phase difference variation and the directional angle $\beta$.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for determining the direction from spaced antennas to a radiating source, said source providing signals which vary in frequency comprising means controlled by signals from at least one of said antennas for detecting a given change in the frequency of signals from said source, means responsive to signals from said antennas under the control of said detecting means for determining the difference in the number of cycles received by said antennas from said source during the period of said given change and means responsive to said difference for producing an indication of direction.

2. A system for determining the direction of a radiating source radiating signals which vary in frequency at least over a given range comprising a plurality of spaced antennas, phase difference detecting means coupled to said antennas and means for detecting the number of cycles output from said phase difference detecting means during the period frequency varies over said given range.

3. A system for determining the direction of a radiating source radiating signals which vary in frequency at least over a given range comprising a plurality of spaced antennas, phase difference detecting means coupled to said antennas, and means under the control of signals from said antennas for detecting the number of cycles output from said phase difference detecting means during the period the frequency of said source varies over said given range.

4. A system for determining the direction to a radiating source comprising a plurality of spaced antennas, phase difference detecting means coupled to said antennas, cycle counting means, gating means coupling said phase difference detecting means to said cycle counting means and means responsive to signals from said antenna to control said gating means whereby cycles are counted as said source radiates over a predetermined frequency range.

5. A system for determining the direction to a radiating souce comprising a plurality of spaced antennas, phase difference detecting means coupled to said antennas, null and peak detecting means coupled to said phase difference detecting means, counting means, gating means coupling said null and peak detecting means to said counting means, means responsive to signals from said antennas for controlling said gating means whereby nulls and peaks in the output of said phase difference detecting means are counted as said source radiates over a predetermined frequency range and means coupled to the output of said counting means for indicating said direction.

6. A system for determining the direction from spaced antennas to a radiating source comprising phase difference detecting means coupled to said antennas for producing a signal amplitude indicative of the phase difference between signals detected by said antennas, cycle counting means, gating means coupling said detecting means to said cycle counting means and means responsive to signals from said antennas for controlling said gating means whereby cycles of said signal amplitude are counted as said source radiates over a predetermined frequency range.

7. A system for determining the direction from spaced antennas to a radiating source comprising phase difference detecting means coupled to said antennas for producing a signal having an amplitude indicative of the phase difference between signals detected by said antennas, null and peak detecting means coupled to said phase difference detecting means, counting means, gating means coupling said null and peak detecting means to said counting means and means responsive to signals from said antennas for controlling said gating means whereby said counting means counts nulls and peaks in the output of said phase difference detecting means as said source radiates over a predetermined frequency range.

8. A system as in claim 7, in which said means for controlling said gating means includes filter means controlling a bistable device whose output controls said gating means.

9. A system for determining the direction to a radiating source comprising a plurality of spaced antennas, different mixing means coupled to each of said antennas, an oscillator coupled to said different mixing means, phase difference detecting means coupled to the output of said mixing means, automatic frequency control means coupling the output of said phase detecting means to said oscillator, cycle counting means, gating means coupling said phase difference detecting means to said cycle counting means and means responsive to said oscillator for generating a gating signal to control said gating means whereby said cycles are counted as said source radiates over a predetermined frequency range.

10. A system as in claim 9, in which said means for generating a gating signal includes a plurality of filter means coupled to said oscillator for controlling stages of a bistable device, the output of one stage of said device being applied to said gating means and the output of another being applied to said counting means to clear said counter.

11. A system for determining the direction to a radiating source comprising a plurality of spaced antennas, different mixing means coupled to each of said antennas, an oscillator coupled to said different mixing means, signal adding means coupled to the outputs of said mixing means, automatic frequency control means coupling the output of said adding means to said oscillator, modulation detecting means coupled to the output of said adding means, cycle counting means, gating means coupling the output of said modulation detection means to said cycle counting means and means responsive to the output of said oscillator for generating a signal for controlling said gating means whereby modulation cycles are counted as said source radiates over a predetermined frequency range.

12. A system for determining the direction to a radiating source comprising at least two spaced antennas, different, mixing means coupled to each of said antennas, an oscillator coupled to each of said mixer means, signal adding means coupled to the output of said mixer means, automatic frequency control means responsive to the output of said adding means for controlling said oscillator, modulation detecting means coupled to the output of said adding means, null and peak detecting means coupled to said modulation detecting means, counting means, gating means coupling said null and peak detecting means to said counting means and a plurality of frequency detecting means coupling the output of said oscillator to a bistable device having one stage coupled to said gating means and another stage coupled to said counting means whereby nulls and peaks in the output of said modulation detecting means are counted as said source radiates over a predetermined frequency range and means responsive to the output of said counting means for indicating said direction.

13. A system for determining the direction from spaced antennas to a radiating source, said source providing signals which vary in frequency, said system comprising means controlled by signals from said antennas for detecting a given change in the frequency of signals from said source, means responsive to signals from said antennas under the control of said detecting means for determining the variation in the phase difference between the signals received by said antennas during the period of said given change, and means coupled to said last mentioned means for producing an indication of said direction.

14. A system for determining the direction from spaced antennas to a radiating source, said source providing signals which vary monotonically in frequency over a predetermined range of frequencies, said system comprising means for detecting a variation in the phase difference between signals received at said antennas, means for accumulating a signal indication proportional to the total variation in said phase difference as the frequency of said source varies over said predetermined range and means for converting said signal indication to a signal representing said direction.

References Cited in the file of this patent

UNITED STATES PATENTS 2,451,823   Guanella _____ Oct. 19, 1948